United States Patent Office 2,999,806
Patented Sept. 12, 1961

2,999,806
TREATMENT OF HYDROCARBON DISTILLATES
Ralph B. Thompson, Hinsdale, Ill., assignor to Universal Oil Products Company, Des Plaines, Ill., a corporation of Delaware
No Drawing. Filed Mar. 13, 1959, Ser. No. 799,069
18 Claims. (Cl. 208—206)

This invention relates to the treatment of hydrocarbon distillates and more particularly to an improved method for oxidizing the mercaptans contained in hydrocarbon distillates. In another embodiment the novel method of the present invention is utilized for effecting regeneration of alkaline solutions which previously had been used to extract acidic components from hydrocarbon distillates.

A very effective catalyst for accomplishing the oxidation of mercaptans in hydrocarbon distillates or mercapto compounds in used alkaline solutions is a metal phthalocyanine, details of which will be hereinafter set forth. While this catalyst is active and stable, in some cases it has been noted that there is a slight tendency for a catalyst to settle out of solution. The precipitation of the catalyst may interfere with its use in the process. The present invention is directed to a novel method of avoiding this difficulty and, accordingly, to improve the use of the catalyst for the purpose.

In one embodiment the present invention relates to a proces for oxidizing a mercapto compound which comprises reacting said mercapto compound with an oxidizing agent in the presence of a phthalocyanine catalyst and an alkali metal phosphate salt.

In a specific embodiment the present invention relates to a method of treating a sour hydrocarbon distillate which comprises reacting said distillate with air in the presence of an alkaline reagent, cobalt phthalocyanine sulfonate and trisodium phosphate.

In still another embodiment the present invention relates to a method of regenerating used caustic solution which comprises reacting the same with air in the presence of vanadium phthalocyanine sulfonate and tripotassium phosphate.

Any suitable phthalocyanine catalyst is used in the present invention and preferably comprises a metal phthalocyanine. Particularly preferred metal phthalocyanines comprise cobalt phthalocyanine and vanadium phthalocyanine. The metal phthalocyanine in general is not readily soluble in aqueous solutions and, therefore, for improved operation is preferably utilized as a derivative thereof. A preferred derivative is the sulfonated derivative. Thus, a particularly preferred phthalocyanine catalyst comprises cobalt phthalocyanine sulfonate. Such a catalyst is available commercially and comprises cobalt phthalocyanine disulfonate and also contains cobalt phthalocyanine monosulfonate. Another preferred catalyst comprises vanadium phthalocyanine sulfonate. These compounds may be obtained from any suitable source or may be prepared in any suitable manner as, for example, by reacting cobalt or vanadium phthalocyanine with 20% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

As hereinbefore set forth, while the phthalocyanine catalyst is very active, there is a tendency in some cases for the catalyst to precipitate out of the alkaline solution. In accordance with the present invention, this precipitation of the catalyst is controlled by the addition of an alkali metal phosphate salt to the alkaline solution containing the catalyst. Any suitable alkali metal phosphate salt may be utilized for this purpose and comprises a salt containing polyvalent ions. Trisodium phosphate is particularly preferred, including the various hydrates thereof. When used in caustic (NaOH) solution, it generally is preferred to use a sodium phosphate salt. Other sodium phosphate salts include disodium phosphate including the various hydrates thereof and the various sodium polyphosphates including sodium diphosphate, sodium triphosphate, sodium tetraphosphate, sodium pentaphosphate, sodium hexaphosphate, sodium heptaphosphate, sodium octaphosphate, sodium nonaphosphate, sodium decaphosphate, etc., and the various hydrates thereof. Because the alkaline solution is strongly basic, the phosphates generally will be converted to the orthophosphates in this medium. In another method, phosphoric acid may be introduced into the alkaline solution to form the orthophosphate in situ.

While the sodium phosphates generally are preferred, the potassium phosphate salts may be used, including preferably tripotassium phosphate. As hereinbefore set forth, the other phosphate salts containing polyvalent ions may be employed as, for example, potassium hydrogen phosphate, potassium pyrophosphate, potassium metaphosphate, etc., as well as the potassium polyphosphates. When used in an alkaline solution comprising potassium hydroxide, the orthophosphate salt will be formed. It is understood that the phosphate salts of lithium, rubidium and cesium may be employed but generally are not preferred because they are more expensive. A mixture of the alkali metal phosphate salts may be employed when there are advantages therefor. It is understood that the different alkali metal phosphate salts are not necessarily equivalent.

The alkali metal phosphate salt will be used in a concentration of from about 0.001% to about 1% by weight of the alkaline reagent and may be incorporated therein in any suitable manner. The alkali metal phosphate salt preferably is added to the solution of phthalocyanine catalyst and alkaline reagent. However, it may be commingled with either of these components prior to its admixture with the other components of the solution.

The phthalocyanine catalyst is used in exceedingly small concentrations. These may range from 5 to 1000 and preferably from 10 to 100 parts per million by weight of the active alkaline reagent in the solution, although lower or higher concentrations may be used in some cases. The use of higher concentrations are unnecessary in most cases but may be used, if desired, and thus may range up to 25% or more by weight of the alkaline reagent.

Treating of the sour hydrocarbon distillate is effected by oxidation of mercaptans. Accordingly, an oxidizing agent is present in the reaction. Air is preferred, although oxygen or other oxygen-containing gas may be utilized. In some cases the sour petroleum distillate may contain entrained oxygen or air in sufficient concentration of accomplish the desired sweetening, but generally it is preferred to introduce air into the reaction. The amount of air must be sufficient to effect oxidation of mercaptans, although an excess thereof generally is not objectionable.

The process of the present invention is particularly applicable to the treatment of petroleum distillates and especially sour gasoline, including cracked gasoline, straight run gasoline, natural gasoline, or mixtures thereof, naphtha, jet fuel, kerosene, aromatic solvent, stove oil, range oil, gas oil, diesel fuel, fuel oil, etc. Other hydrocarbon fractions include lubricating oil, as well as normally gaseous fractions. In still another embodiment the novel features of the present invention may be utilized for purifying other organic fractions containing certain acidic impurities. These organic compounds include alcohols, ketones, aldehydes, etc.

Treatment of the petroleum distillate may be effected in any suitable manner and may be in a batch or continuous process. In a batch process the sour hydrocarbon distillate is introduced into a reaction zone containing the phthalocyanine catalyst, alkaline reagent and alkali metal phosphate salt, and air is introduced therein or passed therethrough. Preferably the reaction zone is equipped with suitable stirrers or other mixing device to obtain intimate mixing. In a continuous process the caustic solution containing phthalocyanine catalyst and alkali metal phosphate salt is passed countercurrently to or concurrently with the sour petroleum distillate in the presence of a continuous stream of air. In a mixed type process, the reaction zone contains the alkaline solution, alkali metal phosphate salt and phthalocyanine catalyst, and gasoline and air are passed continuously therethrough and removed, generally from the upper portion of the reaction zone.

In some cases and particularly in the treatment of sour gasoline, a major proportion of the mercaptans is removed from the gasoline by extraction with an alkaline solution, and particularly caustic solution. This treatment readily is accomplished by either passing the sour gasoline in countercurrent contact with a descending stream of caustic solution or by passing the sour gasoline through a body of caustic solution. In a continuous process the caustic solution containing the mercapto compounds, as well as other acidic components, is subjected to regeneration by oxidizing the mercaptides to form disulfides and to recover the caustic for reuse in the process. Because of the use of the phthalocyanine catalyst, this regeneration is effected by oxidation, and air or other oxidizing gas is supplied to the regeneration zone. In accordance with the present invention, the alkali metal phosphate salt is incorporated in the caustic solution in order to decrease the tendency of the phthalocyanine catalyst to settle out of solution. The regeneration of the caustic solution is effected at ambient temperature, although an elevated temperature which may range up to 200° F. or more may be employed, when desired. The alkali metal salt is used in this embodiment in the same concentration as hereinbefore set forth in connection with the treating step. The regenerated caustic solution will contain disulfides formed in the regeneration, and the mixture is allowed to settle or otherwise treated to separate and remove the disulfides. The disulfides form as an upper layer and are readily removed from the regenerated caustic solution for recycling of the latter.

In still another embodiment of the present invention, and particularly when treating gasoline, a major portion of the mercaptans are removed from the gasoline in the manner hereinbefore set forth and the thus partly treated gasoline, which is reduced in mercaptan content but is not doctor sweet, is subjected to final treating by oxidizing mercaptans contained therein in the manner hereinabove set forth. The gasoline after the final treatment will be doctor sweet or substantially so and may be recovered as the final product of the combination process.

The following examples are introduced to illustrate further the novelty and utility of the present invention but not with the intention of unduly limiting the same.

*Example I*

The phthalocyanine catalyst of this example is cobalt phthalocyanine sulfonate. A solution of 250 parts per million of this catalyst, based on the active NaOH, was dissolved in a 10% by weight aqueous caustic solution.

After thorough shaking to obtain complete solution of the cobalt phthalocyanine sulfonate, the flask containing the solution was allowed to stand at room temperature. With this particular cobalt phthalocyanine sulfonate, a large portion of the catalyst settled out of solution after standing for 15 minutes.

1% by weight of trisodium phosphate, based on the NaOH in the alkaline solution, was incorporated in another solution prepared in the manner described above. After shaking to obtain intimate mixing, the flask was allowed to stand at room temperature. In this case the cobalt phthalocyanine sulfonate did not settle out of solution for 4 hours.

From the above examples it will be noted that the addition of the trisodium phosphate served to decrease precipitation of the cobalt phthalocyanine sulfonate out of solution. As hereinbefore set forth, this benefit is of value in the use of the catalyst in alkaline solutions.

*Example II*

This example describes the use of a caustic solution containing 70 parts per million of cobalt phthalocyanine sulfonate and 50 parts per million of trisodium phosphate, both being based on the active NaOH in the caustic solution. A commercial J.P.–4 jet fuel having an original mercaptan content of 0.327% by weight, is contacted with the above solution at a temperature of 100° F. for a period of 30 minutes. The mercaptan sulfur content is reduced to less than 0.05% by weight. It will be noted that this mercaptan sulfur content is less than that generally required in the specifications for jet fuel and that the treated jet fuel now will pass such specifications.

*Example III*

Cracked gasoline having a mercaptan sulfur content of 0.004% by weight is subjected to sweetening by being passed concurrently with a stream of air and caustic solution containing 100 parts per million of vanadium phthalocyanine sulfonate and 70 parts per million of sodium tripolyphosphate, both based on the NaOH in the caustic solution. The mixture is passed through a sweetening zone at 120° F. and a pressure of 30 pounds per square inch gauge. The gasoline is separated from the alkaline solution and the latter is recirculated for contacting additional sour gasoline. The gasoline treated in this manner is sweet to the doctor test.

*Example IV*

This example illustrates the use of the novel features of the present invention in a combination extraction, caustic regeneration and sweetening process. The catalyst used in this example is vanadium phthalocyanine carboxylate and the alkali metal phosphate salt is potassium tripolyphosphate. The gasoline used in this example is a cracked gasoline having a total sulfur content of 0.16% by weight and a mercaptan sulfur content of 0.09% by weight. The treating solution is a 10° Baume aqueous caustic solution containing 100 parts per million of vanadium phthalocyanine carboxylate and 65 parts per million of potassium tripolyphosphate. A major portion of this treating solution is passed countercurrently to an ascending stream of the sour cracked gasoline in an extraction zone containing bubble trays. The partly treated gasoline is withdrawn from the upper portion of the extraction zone and has a mercaptan sulfur content of 0.009% by weight.

The caustic solution containing the phthalocyanine catalyst and sodium tripolyphosphate is withdrawn from the lower portion of the extraction zone and then is sent to a regeneration zone, whereto air is introduced at a rate of 750 cc. per hour. Both the extraction and regeneration are effected at substantially ambient temperature and pressure. In the regeneration zone, oxidation of the sodium mercaptides to form disulfides and to regenerate the caustic solution is effected. Excess air is removed from the upper portion of the regeneration zone, while the regenerated caustic solution containing disulfides is withdrawn from the lower portion of the regeneration zone and sent to a settling zone. In the settling zone an upper layer of disulfides separates and is withdrawn. The regenerated caustic solution is recycled to the extraction zone for further use in extracting mercaptans and other acidic components from cracked gasoline.

The partly treated gasoline from the extraction zone is sent to a sweetening zone. In the sweetening zone the gasoline is passed concurrently with air, at a rate of 75 cc. per hour, and a minor portion of the caustic solution containing the phthalocyanine catalyst and the potassium tripolyphosphate. The effluent from the sweetening zone is sent to a settling zone wherein treated gasoline is separated from caustic solution. The treated gasoline is sweet. The caustic solution containing phthalocyanine catalyst and sodium tripolyphosphate is recycled to the sweetening zone for further use in treating additional gasoline.

I claim as my invention:

1. A method of oxidizing a mercapto compound to a disulfide compound which comprises reacting said mercapto compound with an oxidizing agent in the presence of a solution of a phthalocyanine catalyst and a sufficient amount of an alkali metal phosphate salt to substantially prevent precipitation of said catalyst out of the solution.

2. A method of treating a sour hydrocarbon distillate which comprises reacting mercaptans contained in said distillate with air in the presence of an alkaline solution of cobalt phthalocyanine catalyst and a sufficient amount of a sodium phosphate salt to substantially prevent precipitation of said catalyst out of the solution.

3. A method of treating a sour hydrocarbon distillate which comprises reacting mercaptans contained in said distillate with air in the presence of an alkaline solution of vanadium phthalocyanine catalyst and a sufficient amount of a sodium phosphate salt to substantially prevent precipitation of said catalyst out of the solution.

4. A method of sweetening a sour gasoline which comprises reacting mercaptans contained in said gasoline with air in the presence of a caustic solution of cobalt phthalocyanine sulfonate catalyst and a sufficient amount of trisodium phosphate to substantially prevent precipitation of said catalyst out of the solution.

5. A method of sweetening a sour gasoline which comprises reacting mercaptans contained in said gasoline with air in the presence of a caustic solution of vanadium phthalocyanine sulfonate catalyst and a sufficient amount of trisodium phosphate to substantially prevent precipitation of said catalyst out of the solution.

6. A method of sweetening a sour gasoline which comprises reacting mercaptans contained in said gasoline with air in the presence of a caustic solution of cobalt phthalocyanine carboxylate catalyst and a sufficient amount of trisodium phosphate to substantially prevent precipitation of said catalyst out of the solution.

7. A method of sweetening a sour gasoline which comprises reacting mercaptans contained in said gasoline with air in the presence of a caustic solution of vanadium phthalocyanine carboxylate catalyst and a sufficient amount of trisodium phosphate to substantially prevent precipitation of said catalyst out of the solution.

8. A method of regenerating a used alkaline reagent containing mercapto compounds which comprises reacting the same with an oxidizing agent in the presence of a phthalocyanine catalyst and an alkali metal phosphate salt in an amount of from about 0.001% to about 1% by weight of said alkaline reagent.

9. A method of regenerating a caustic solution previously used for the removal of acidic components from hydrocarbon distillate, which comprises reacting the mercapto compounds contained in said caustic solution with air in the presence of cobalt phthalocyanine sulfonate catalyst and a sodium phosphate salt in an amount of from about 0.001% to about 1% by weight of said caustic solution.

10. A method of regenerating a caustic solution previously used for the removal of acidic components from hydrocarbon distillate, which comprises reacting the mercapto compounds contained in said caustic solution with air in the presence of vanadium phthalocyanine sulfonate catalyst and a sodium phosphate salt in an amount of from about 0.001% to about 1% by weight of said caustic solution.

11. A method of regenerating a caustic solution previously used for the removal of mercaptans from sour gasoline, which comprises reacting the mercapto compounds contained in said caustic solution with air in the presence of a cobalt phthalocyanine sulfonate catalyst and trisodium phosphate in an amount of from about 0.001% to about 1% by weight of said caustic solution.

12. A method of regenerating a caustic solution previously used for the removal of mercaptans from sour gasoline, which comprises reacting the mercapto compounds contained in said caustic solution with air in the presence of a vanadium phthalocyanine sulfonate catalyst and trisodium phosphate in an amount of from about 0.001% to about 1% by weight of said caustic solution.

13. A method of regenerating a caustic solution previously used for the removal of mercaptans from sour gasoline, which comprises reacting the mercapto compounds contained in said caustic solution with air in the presence of a cobalt phthalocyanine carboxylate catalyst and trisodium phosphate in an amount of from about 0.001% to about 1% by weight of said caustic solution.

14. A method of regenerating a caustic solution previously used for the removal of mercaptans from sour gasoline, which comprises reacting the mercapto compounds contained in said caustic solution with air in the presence of a vanadium phthalocyanine carboxylate catalyst and trisodium phosphate in an amount of from about 0.001% to about 1% by weight of said caustic solution.

15. A method of oxidizing a mercapto compound to a disulfide compound which comprises reacting said mercapto compound with an oxidizing agent in the presence of a phthalocyanine catalyst in an alkaline solution containing from about 0.001% to about 1% by weight of an alkali metal phosphate salt.

16. A method of treating a sour hydrocarbon distillate which comprises reacting mercaptans contained in said distillate with air in the presence of a phthalocyanine catalyst in an alkaline solution containing from about 0.001% to about 1% by weight of an alkali metal phosphate salt.

17. A method of treating a sour hydrocarbon distillate which comprises reacting mercaptans contained in said distillate with air in the presence of a caustic solution of a phthalocyanine catalyst and from about 0.001% to about 1% by weight of an alkali metal phosphate salt.

18. A method of sweetening a sour gasoline which comprises reacting mercaptans contained in said gasoline with air in the presence of a caustic solution of cobalt phthalocyanine sulfonate catalyst and from about 0.001% to about 1% by weight of trisodium phosphate.

References Cited in the file of this patent

UNITED STATES PATENTS

| | | |
|---|---|---|
| 1,815,563 | Henderson et al. | July 21, 1931 |
| 2,744,854 | Urban | May 8, 1956 |
| 2,882,224 | Gleim et al. | Apr. 14, 1959 |